US012633757B2

(12) United States Patent
Mitsugi

(10) Patent No.: US 12,633,757 B2
(45) Date of Patent: May 19, 2026

(54) POWER SUPPLY SYSTEM FOR INDEPENDENT SYSTEM

(71) Applicant: Toshiba Mitsubishi-Electric Industrial Systems Corporation, Tokyo (JP)

(72) Inventor: Yasuaki Mitsugi, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 257 days.

(21) Appl. No.: 18/555,264

(22) PCT Filed: Feb. 17, 2022

(86) PCT No.: PCT/JP2022/006335
§ 371 (c)(1),
(2) Date: Oct. 13, 2023

(87) PCT Pub. No.: WO2023/157162
PCT Pub. Date: Aug. 24, 2023

(65) Prior Publication Data
US 2024/0128764 A1 Apr. 18, 2024

(51) Int. Cl.
*H02J 3/46* (2006.01)
*H02M 1/00* (2006.01)
*H02M 7/493* (2007.01)

(52) U.S. Cl.
CPC ............. *H02J 3/46* (2013.01); *H02M 1/0038* (2021.05); *H02M 7/493* (2013.01)

(58) Field of Classification Search
CPC ................................... H02J 3/46; H02M 7/49
See application file for complete search history.

(56) References Cited

U.S. PATENT DOCUMENTS

| 10,468,888 | B2 * | 11/2019 | Okochi | ................... H02J 3/381 |
| 2018/0138713 | A1 * | 5/2018 | Matsuoka | ................. H02J 3/38 |
| 2019/0181643 | A1 | 6/2019 | Chae et al. | |

FOREIGN PATENT DOCUMENTS

| CN | 103683324 A | 3/2014 |
| CN | 111756262 A | 10/2020 |

(Continued)

OTHER PUBLICATIONS

International Search Report and Written Opinion mailed on Apr. 26, 2022, received for PCT Application PCT/JP2022/006335, filed on Feb. 17, 2022, 8 pages including English Translation.

(Continued)

*Primary Examiner* — Gary A Nash
(74) *Attorney, Agent, or Firm* — XSENSUS LLP

(57) ABSTRACT

A power supply system for an independent system includes a plurality of power supply devices, a plurality of power conversion devices, and a control device, the plurality of power conversion devices are connected in parallel to the independent system, the plurality of power conversion devices are voltage source voltage-controlled, the plurality of power conversion devices convert power supplied from the plurality of power supply devices into alternating current power corresponding to the independent system, the plurality of power conversion devices supply the alternating current power after the conversion to the independent system, the control device controls conversion operations of the power of the plurality of power conversion devices, the control device calculates a plurality of active power command values of the plurality of power conversion devices according to active power required by the independent system, and calculates a plurality of reactive power command values.

5 Claims, 3 Drawing Sheets

(56)                    References Cited

FOREIGN PATENT DOCUMENTS

JP          2019-527024  A      9/2019
KR     10-2016-0060851  A      5/2016

OTHER PUBLICATIONS

Extended European Search Report issued Nov. 24, 2025 in European Patent Application No. 22927064.0.

* cited by examiner

POWER SUPPLY SYSTEM FOR INDEPENDENT SYSTEM

CROSS-REFERENCE TO RELATED APPLICATION

The present application is based on PCT filing PCT/JP2022/006335, filed Feb. 17, 2022, the entire contents of which are incorporated herein by reference.

FIELD

Embodiments described herein relate generally to a power supply system for independent system.

BACKGROUND ART

There are power supply systems for independent systems that supply power to independent systems not connected with a large-scale power system provided by an electric company or the like. For example, power supply systems for independent systems are used in plants, specific localities, and the like and may be called microgrids, etc.

A power supply system includes a power supply device, and a power conversion device that converts power supplied from the power supply device into AC power corresponding to an independent system and supplies the AC power after the conversion to the independent system. The power supply device includes, for example, a distributed power source such as a power storage device, a solar power generation device, a wind power generation device, etc.

The use of a voltage source voltage-controlled power conversion device (Grid forming inverter) in which the voltage is the controlled object is being considered as such a power supply system for independent systems. A voltage source current-controlled power conversion device (Grid following inverter) in which the current is the controlled object is difficult to operate stably when the independent system does not include another voltage source such as a diesel generator or the like. In contrast, a voltage source voltage-controlled power conversion device can be stably operated and can have a simpler power supply system and/or independent system configuration even when the independent system does not include another voltage source.

However, for voltage source voltage-controlled power conversion devices, when multiple power conversion devices are connected in parallel to the independent system and operated in parallel, the operation may destabilize, and stable power can no longer be supplied to the independent system.

For example, the parallel operation of multiple power conversion devices may be necessary in a relatively large-scale independent system, etc. It is therefore desirable to stably supply power to the independent system even when multiple voltage source voltage-controlled power conversion devices are operated in parallel in the power supply system for the independent system.

PRIOR ART DOCUMENTS

Patent Documents

[Patent Document 1]
 Japanese Unexamined Patent Application Publication (Translation of PCT Application) No. 2019-527024

SUMMARY OF INVENTION

Technical Problem

Embodiments of the invention provide a power supply system for an independent system that can stably supply power to the independent system even when multiple voltage source voltage-controlled power conversion devices are operated in parallel.

Solution to Problem

A power supply system for an independent system provided according to an embodiment of the invention includes a plurality of power supply devices, a plurality of power conversion devices, and a control device, the power supply system supplies alternating current power to the independent system, the plurality of power conversion devices are connected in parallel to the independent system, the plurality of power conversion devices are voltage source voltage-controlled, the plurality of power conversion devices convert power supplied from the plurality of power supply devices into alternating current power corresponding to the independent system, the plurality of power conversion devices supply the alternating current power after the conversion to the independent system, the control device controls conversion operations of the power of the plurality of power conversion devices, the control device calculates a plurality of active power command values of the plurality of power conversion devices according to active power required by the independent system, and calculates a plurality of reactive power command values of the plurality of power conversion devices according to reactive power required by the independent system, the plurality of power conversion devices perform voltage-controlled operations to output active power corresponding to the active power command values and to output reactive power corresponding to the reactive power command values.

Advantageous Effects of Invention

According to embodiments of the invention, a power supply system for an independent system is provided that can stably supply power to the independent system even when multiple voltage source voltage-controlled power conversion devices are operated in parallel.

DESCRIPTION OF EMBODIMENTS

Figure 1:
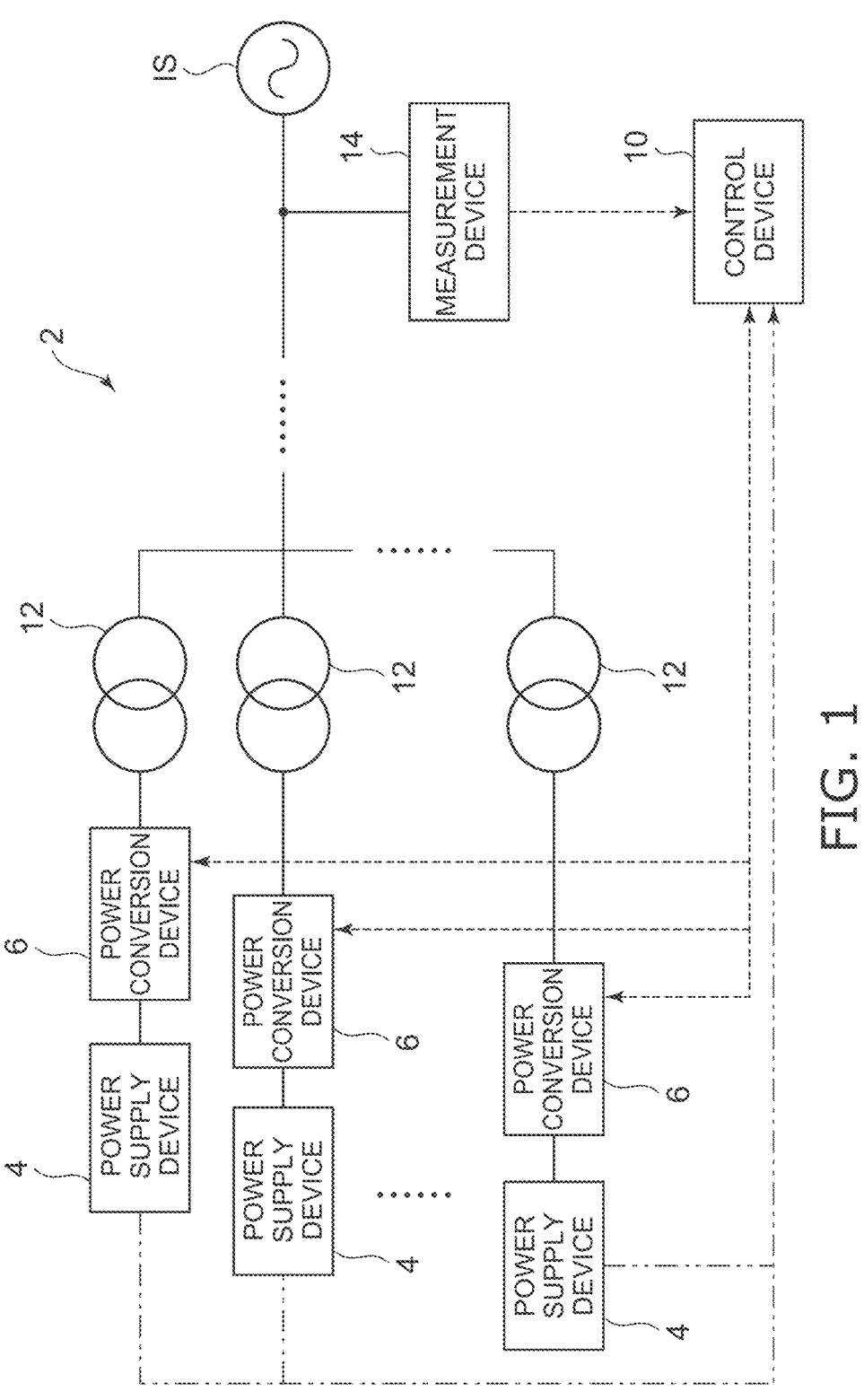
FIG. 1 is a block diagram schematically illustrating a power supply system for an independent system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating a power supply system for an independent system according to an embodiment.

As illustrated in FIG. 1, the power supply system 2 for the independent system (hereinbelow, called the power supply system 2) includes multiple power supply devices 4, multiple power conversion devices 6, and a control device 10.

The power supply system 2 is connected with an independent system IS. The independent system IS is a system that is not connected with a large-scale power system provided by an electric company or the like. The independent system IS is an alternating current system. The AC power of the independent system IS is, for example, three-phase AC power. However, the AC power of the independent system IS may be single-phase AC power, etc. The power supply system 2 supplies the AC power to the independent system IS.

The multiple power supply devices 4 are provided to correspond to the multiple power conversion devices 6. The number of the multiple power supply devices 4 is, for example, equal to the number of the multiple power conversion devices 6. The multiple power supply devices 4 are connected respectively to the multiple power conversion devices 6. However, multiple power supply devices 4 may be connected to one power conversion device 6. Conversely, one power supply device 4 may be connected to multiple power conversion devices 6. The number of the multiple power supply devices 4 may not always be equal to the number of the multiple power conversion devices 6.

The multiple power supply devices 4 supply power respectively to the multiple power conversion devices 6. The multiple power supply devices 4 are, for example, power storage devices that use storage batteries, etc. The multiple power supply devices 4 supply DC power respectively to the multiple power conversion devices 6.

The multiple power conversion devices 6 are provided to correspond to the multiple power supply devices 4. The multiple power conversion devices 6 are connected to the multiple power supply devices 4 and connected with the multiple power supply devices 4 and connected with the independent system IS. The multiple power conversion devices 6 are connected in parallel to the independent system IS. The multiple power conversion devices 6 convert the power supplied from the multiple power supply devices 4 into AC power corresponding to the independent system IS and supply the AC power after the conversion to the independent system IS.

The multiple power conversion devices 6 are voltage source voltage-controlled power conversion devices in which the voltage is the controlled object. Accordingly, stable power can be supplied to the independent system IS even when another voltage source does not exist in the independent system IS. Also, the multiple power conversion devices 6 operate in parallel. Accordingly, power can be stably supplied even to a relatively large-scale independent system IS.

For example, an AC load such as an induction motor or the like is connected to the independent system IS. In other words, the multiple power conversion devices 6 (power supply systems 2) supply AC power to the AC load via the independent system IS. Other than an AC load, for example, a synchronous generator, etc., may be connected to the independent system IS. For example, voltage source current-controlled power conversion devices used in a storage battery system, solar power generation system, etc., also may be connected to the independent system IS. In other words, the independent system IS may be connected with other power supplies.

When the multiple power supply devices 4 are power storage devices, the multiple power conversion devices 6 also have the function of charging the multiple power supply devices 4 by converting the AC power of the independent system IS into DC power.

However, the multiple power supply devices 4 are not limited to power storage devices and may be, for example, solar cell panels, etc. In such a case, the multiple power conversion devices 6 may not have the function of converting the AC power input from the independent system IS into DC power.

Also, the multiple power supply devices 4 may be, for example, other generators such as wind power generators, gas turbine generators, etc. The power that is input from the multiple power supply devices 4 to the multiple power conversion devices 6 is not limited to DC power and may be AC power. The multiple power conversion devices 6 may be configured to convert the AC power input from the multiple power supply devices 4 into other AC power that corresponds to the independent system IS.

Thus, the conversion of the power by the multiple power conversion devices 6 is not limited to a conversion from direct current to alternating current, and may be any conversion that converts the power of the multiple power supply devices 4 into AC power that corresponds to the independent system IS.

For example, the power supply system 2 further includes multiple transformers 12 and a measurement device 14. The multiple transformers 12 are provided to correspond respectively to the multiple power conversion devices 6. The multiple power conversion devices 6 are connected to the primary sides of the multiple transformers 12. The secondary sides of the multiple transformers 12 are connected to the independent system IS. Thus, the multiple power conversion devices 6 are connected with the independent system IS via the multiple transformers 12. The multiple power conversion devices 6 are connected in parallel to the independent system IS via the multiple transformers 12.

Thus, by connecting the multiple power conversion devices 6 in parallel via the multiple transformers 12, the occurrence of cross current between the multiple power conversion devices 6 can be suppressed even when the multiple power conversion devices 6 are operated in parallel. In other words, the undesirable flow of the current output from the power conversion device 6 into another power conversion device 6 instead of the independent system IS can be suppressed.

Circuit breakers, more transformers, etc., may be located between the independent system IS and the multiple power conversion devices 6. The configuration between the independent system IS and the multiple power conversion devices 6 may be any configuration in which the multiple power conversion devices 6 are connectable to the independent system IS.

The measurement device 14 measures the active power and voltage of the control point of the multiple power conversion devices 6 and inputs the active power measurement value and the voltage measurement value to the control device 10. In other words, the control point of the multiple power conversion devices 6 is the connection point (the connection point) between the multiple power conversion devices 6 and the independent system IS.

The control point of the active power control of the multiple power conversion devices 6 may not always be the same as the control point of the voltage control of the multiple power conversion devices 6. The measurement device 14 may include, for example, a power measuring device that measures the active power at a control point of the active power control, and a voltage measuring device that measures the voltage at a control point of the voltage control.

The control device 10 controls the conversion operations of the power of the multiple power conversion devices 6. For example, the control device 10 communicates with the measurement device 14 and receives, from the measurement device 14, the input of information of the active power measurement value of the control point and information of the voltage measurement value of the control point. Also, for example, the control device 10 communicates with each of the multiple power supply devices 4 and receives the input of information related to the multiple power supply devices 4 from each of the multiple power supply devices 4. Based on the information that is input, the control device 10 controls the operations of the multiple power conversion devices 6.

When the multiple power supply devices 4 are power storage devices, the information related to the multiple power supply devices 4 is, for example, information related to the charging/discharging capacities of the multiple power supply devices 4. More specifically, the information related to the multiple power supply devices 4 is information of the remaining amounts of the electrical storage capacities (SOC: State Of Charge) of the power supply devices 4. The information of the remaining amount of the electrical storage capacity may be information of the remaining amount of the electrical storage capacity as-is, or may be, for example, information such as the voltage of the power supply device 4, etc., from which the remaining amount of the electrical storage capacity (the information related to the charging/discharging capacity) of the control device 10 can be calculated. The information that is related to the charging/discharging capacity is not limited to the information described above and may be any information from which the charging/discharging capacities of the power supply devices 4 of the control device 10 can be ascertained.

When the multiple power supply devices 4 are generators such as solar panels, wind power generators, etc., the information that is related to the multiple power supply devices 4 is, for example, information related to the power generation amounts of the multiple power supply devices 4.

The information that is input to the control device 10 is not limited to the information described above. For example, the control device 10 may communicate with each of the multiple power conversion devices 6 to receive the input of information of the active power output values of the multiple power conversion devices 6, information of the reactive power output values of the multiple power conversion devices 6, etc. The information that is input to the control device 10 may be any information necessary for controlling the multiple power conversion devices 6.

Also, for example, the information may be input to the control device 10 from a higher-level controller, etc. The control device 10 may not always communicate directly with the measurement device 14, the multiple power supply devices 4, etc. The method for inputting the information to the control device 10 may be any method by which the information can be appropriately input to the control device 10.

Figure 2:
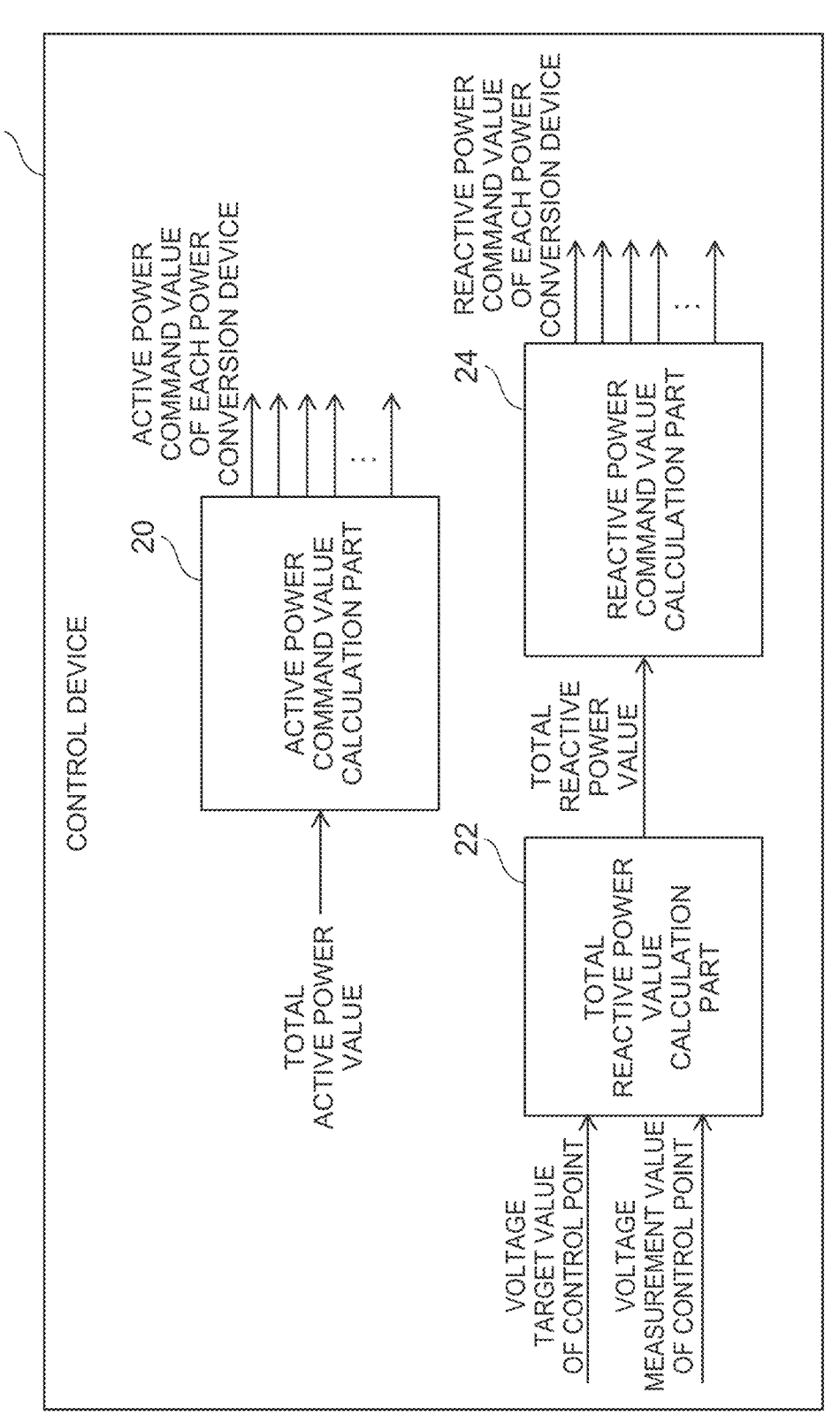
FIG. 2 is a block diagram schematically illustrating an example of the control device according to the embodiment.

FIG. 2 is a block diagram schematically illustrating an example of the control device according to the embodiment.

As illustrated in FIG. 2, the control device 10 includes an active power command value calculation part 20, a total reactive power value calculation part 22, and a reactive power command value calculation part 24. Based on the information that is input, the control device 10 calculates the active power command value and the reactive power command value of each of the multiple power conversion devices 6 and controls the conversion operations of the power of the multiple power conversion devices 6 by inputting the calculated active power command values and reactive power command values to each of the multiple power conversion devices 6.

The total active power value that indicates the magnitude of the active power to be output from the entirety of the multiple power conversion devices 6 is input to the active power command value calculation part 20. When the independent system IS does not receive a supply of power from another power supply, the active power measurement value of the control point can be considered to be the magnitude of the active power currently necessary in the independent system IS. Accordingly, the active power measurement value that is input from the measurement device 14 is input by the control device 10 to the active power command value calculation part 20 as the total active power value.

Also, the active power measurement value at the control point is substantially equal to the total value of the active power output values of the multiple power conversion devices 6. Accordingly, the control device 10 may acquire the information of the active power output values of the multiple power conversion devices 6 and input the total value of the active power output values to the active power command value calculation part 20 as the total active power value.

Based on the total active power value that is input, the active power command value calculation part 20 calculates the multiple active power command values indicating the magnitudes of the active power to be individually output from the multiple power conversion devices 6.

At this time, for example, the active power command value calculation part 20 proportionally processes the multiple active power command values so that the magnitudes are the appropriate magnitudes of the active power corresponding to the states of the multiple power conversion devices 6.

For example, when the multiple power supply devices 4 are power storage devices, the active power command value calculation part 20 proportionally processes the multiple active power command values so that the magnitudes of the active power when discharging are greater for the power conversion devices 6 corresponding to the power supply devices 4 having high remaining amounts of the electrical storage capacities than for the power conversion devices 6 corresponding to the power supply devices 4 having low remaining amounts of the electrical storage capacities, and so that the magnitudes of active power when charging are less for the power conversion devices 6 corresponding to the power supply devices 4 having high remaining amounts of the electrical storage capacities than for the power conversion devices 6 corresponding to the power supply devices 4 having low remaining amounts of the electrical storage capacities.

Thus, for example, the active power command value calculation part 20 performs proportional processing based on the information related to the multiple power supply devices 4. For example, when discharging ($P_{Total}>0$), the active power command value calculation part 20 calculates active power command values $P_{ref}(i)$ of the multiple power conversion devices 6 by the following formula (1), wherein $P_{Total}$ (units: W) is the total active power value, $P_{ref}(i)$ (units: W) is the active power command value of each of the multiple power conversion devices 6, SOC(i) (units: %) is the remaining amount of the electrical storage capacity of each of the multiple power supply devices 4, and $SOC_{Total}$ (units: %) is the total value of the remaining amounts of the electrical storage capacities of the multiple power supply devices 4.

$$P_{ref}(i)=P_{Total}\times(SOC(i)/SOC_{Total}) \tag{1}$$

(i) is a variable that individually indicates the multiple power conversion devices 6 and the corresponding power supply devices 4. $SOC_{Total}$ is, in other words, the total value of the multiple SOC(i).

In other words, the ratios of the remaining amounts of the individual electrical storage capacities with respect to the total value of the remaining amounts of the electrical storage capacities are calculated; and the ratios are multiplied by the total active power value. Accordingly, as described above, the proportional processing can be performed so that the magnitudes of the active power when discharging are greater for the power conversion devices 6 corresponding to the power supply devices 4 having high remaining amounts of the electrical storage capacities than for the power conversion devices 6 corresponding to the power supply devices 4 having low remaining amounts of the electrical storage capacities.

Also, the active power command value calculation part 20 calculates the active power command values $P_{ref}(i)$ of the multiple power conversion devices 6 when charging ($P_{Total}<0$) by the following formula (2), wherein BAU(i) (units: %) is the battery usage amount of each of the multiple power supply devices 4, and $BAU_{Total}$ (units: %) is the total value of the battery usage amounts of the multiple power supply devices 4.

$$P_{ref}(i)=P_{Total}\times(BAU(i)/BAU_{Total}) \tag{2}$$

BAU(i) is BAU(i)=100−SOC(i). In other words, $BAU_{Total}$ is the total value of the multiple BAU(i).

Thereby, as described above, the proportional processing can be performed so that the magnitudes of the active power when charging are less for the power conversion devices 6 corresponding to the power supply devices 4 having high remaining amounts of the electrical storage capacities than for the power conversion devices 6 corresponding to the power supply devices 4 having low remaining amounts of the electrical storage capacities.

For example, when the multiple power supply devices 4 are generators, the active power command value calculation part 20 proportionally processes the multiple active power command values so that the magnitudes of the active power are greater for the power conversion devices 6 corresponding to the power supply devices 4 having high power generation amounts than for the power conversion devices 6 corresponding to the power supply devices 4 having low power generation amounts. For example, the proportional processing can be calculated by replacing the remaining amount SOC(i) of the electrical storage capacity with the power generation amount in formula (1) described above.

The active power command value calculation part 20 may not always perform proportional processing such as that described above. For example, the active power command value calculation part 20 may calculate the average value of the total active power value divided by the number of the multiple power conversion devices 6 as the multiple active power command values.

For example, the voltage target value of the control point and the voltage measurement value of the control point input from the measurement device 14 are input to the total reactive power value calculation part 22. The voltage target value may be a preset constant value, or may be a variable input from a higher-level controller, etc.

Based on the voltage target value and the voltage measurement value that are input, the total reactive power value calculation part 22 calculates the total reactive power value indicating the magnitude of the reactive power to be output from the entirety of the multiple power conversion devices 6. For example, the total reactive power value calculation part 22 calculates the total reactive power value by calculating the difference between the voltage target value and the voltage measurement value and by performing PI control of the calculated difference.

For example, the total reactive power value calculation part 22 calculates the total reactive power value so that the total reactive power value is increased when the voltage measurement value is less than the voltage target value, and the total reactive power value is reduced when the voltage measurement value is greater than the voltage target value. Accordingly, the control can be performed so that the voltage measurement value approaches the voltage target value and the voltage of the control point is maintained at a constant.

The calculation of the total reactive power value by the total reactive power value calculation part 22 is not limited to PI control and may be proportional control, PID control, etc. The calculation of the total reactive power value by the total reactive power value calculation part 22 may be any calculation that can appropriately calculate the total reactive power value based on the voltage target value and the voltage measurement value.

The total reactive power value calculation part 22 inputs the calculated total reactive power value to the reactive power command value calculation part 24. For example, a higher-level controller or the like may calculate the total reactive power value and input the total reactive power value to the control device 10. The control device 10 may not always include the total reactive power value calculation part 22.

Based on the total reactive power value that is input, the reactive power command value calculation part 24 calculates the multiple reactive power command values indicating the magnitudes of the reactive power to be individually output from the multiple power conversion devices 6.

For example, the reactive power command value calculation part 24 proportionally processes the multiple reactive power command values so that the magnitudes are the appropriate magnitudes of the reactive power considering the reactive power output upper limits of the multiple power conversion devices 6.

For example, the reactive power command value calculation part 24 calculates the average value of the total reactive power value divided by the number of the multiple power conversion devices 6. Subsequently, the reactive power command value calculation part 24 checks whether or not the average value is greater than the reactive power output upper limit for each of the multiple power conversion devices 6.

When the average value is greater than the reactive power output upper limit, the excess amount is allotted to a power conversion device 6 having an ample margin. In other words, the excess amount is added to the reactive power command value of another power conversion device 6 that is not greater than the reactive power output upper limit; and the reactive power command value of the power conversion device 6 that is greater than the reactive power output upper limit is limited to the reactive power output upper limit.

Also, for example, when the total reactive power value is greater than the total value of the reactive power output upper limits of the multiple power conversion devices 6, the reactive power command value calculation part 24 limits the total reactive power value to the total value of the reactive power output upper limits.

As described above, the multiple reactive power command values can be apportioned thereby. The reactive power output upper limit of each of the multiple power conversion devices 6 may be a preset constant value or may be a variable input from a higher-level controller, etc.

The reactive power command value calculation part 24 may not always perform proportional processing such as that described above. For example, the reactive power command value calculation part 24 may calculate the average value of the total reactive power value divided by the number of the multiple power conversion devices 6 as the multiple reactive power command values.

The control device 10 inputs the active power command values of the multiple power conversion devices 6 calculated by the active power command value calculation part 20 and the reactive power command values of the multiple power conversion devices 6 calculated by the reactive power command value calculation part 24 respectively to the multiple power conversion devices 6. The control device 10 thereby controls the conversion operations of the power of the multiple power conversion devices 6.

However, the configuration of the control device 10 is not limited to the configuration described above. For example, the control device 10 may be configured to calculate the total active power value from the difference between the active power target value of the control point and the active power measurement value of the control point. The configuration of the control device 10 may be any configuration that can appropriately calculate the multiple active power command values and the multiple reactive power command values based on multiple information that is input.

Figure 3:
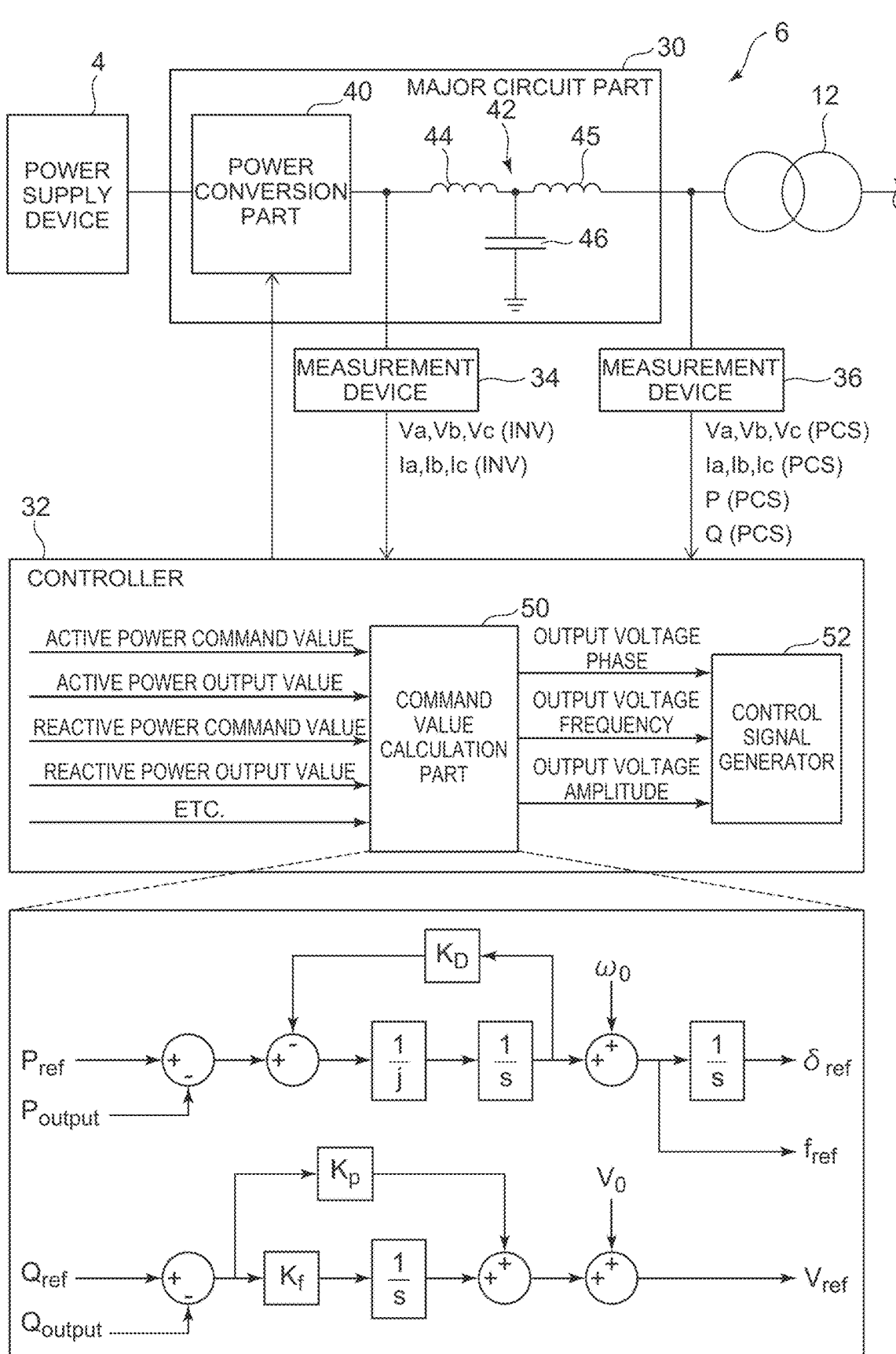
FIG. 3 is a block diagram schematically illustrating an example of the power conversion device according to the embodiment.

FIG. 3 is a block diagram schematically illustrating an example of the power conversion device according to the embodiment.

As illustrated in FIG. 3, the power conversion device 6 includes a major circuit part 30, a controller 32, and measurement devices 34 and 36. The major circuit part 30 converts the power. The controller 32 controls the conversion of the power by the major circuit part 30. Because the configurations of the multiple power conversion devices 6 are substantially the same, the configuration of only one power conversion device 6 is described here.

The major circuit part 30 is connected with the power supply device 4 and the independent system IS. For example, the major circuit part 30 converts the DC power input from the power supply device 4 into AC power corresponding to the independent system IS and outputs the AC power after the conversion to the independent system IS, and charges the power supply device 4 by converting the AC power input from the independent system IS into DC power. Thereby, the major circuit part 30 connects the power supply device 4 with the independent system IS. However, the conversion of the power by the major circuit part 30 is not limited to a conversion from direct current to alternating current and may be any conversion in which the power of the power supply device 4 is converted into AC power corresponding to the independent system IS.

The major circuit part 30 includes a power conversion part 40 and a filter circuit 42. The power conversion part 40 converts the power. For example, the power conversion part 40 includes multiple switching elements and converts the power by switching the multiple switching elements. The power conversion part 40 includes, for example, multiple switching elements having a three-phase bridge connection. The configuration of the power conversion part 40 may be any configuration that can convert the power that is input to AC power corresponding to the independent system IS by switching multiple switching elements, etc.

The filter circuit 42 is located at the alternating current side of the power conversion part 40. In other words, the filter circuit 42 is located between the power conversion part 40 and the independent system IS. In the example, the filter circuit 42 is located between the power conversion part 40 and the transformer 12. The filter circuit 42 causes the AC power output from the power conversion part 40 to approach a sine wave. The filter circuit 42 causes the AC power output from the power conversion part 40 to approach a sine wave by, for example, suppressing high-frequency components included in the AC power output from the power conversion part 40.

The filter circuit 42 includes, for example, reactors 44 and 45 that are connected in series with the AC output point of the power conversion part 40, and a capacitor 46 that is connected in parallel with the AC output point of the power conversion part 40. The reactors 44 and 45 and the capacitor 46 are provided for each phase of the AC power output from the power conversion part 40.

The reactor 45 is connected in series with the reactor 44. In other words, the reactor 45 is located between the reactor 44 and the transformer 12. The capacitor 46 is connected in parallel with the AC output point of the power conversion part 40 by being connected to the connection point of the reactors 44 and 45.

In the example, the multiple power conversion devices 6 are connected in parallel to the independent system IS via the transformer 12 and the reactor 45. Accordingly, the occurrence of cross current between the multiple power conversion devices 6 can be more appropriately suppressed by reactance components of the transformer 12 and the reactor 45.

However, the configuration of the filter circuit 42 is not limited to the configuration described above and may be any configuration that can cause the AC power output from the power conversion part 40 to approach a sine wave. For example, the reactor 45 of the filter circuit 42 may be omitted when only the transformer 12 can appropriately suppress the occurrence of cross current.

Also, the transformer 12 may be omitted when only the reactor 45 can appropriately suppress the occurrence of cross current. In other words, the multiple power conversion devices 6 are connected in parallel to the independent system IS via at least one of the transformer 12 or the reactor 45. Accordingly, the occurrence of cross current between the multiple power conversion devices 6 can be suppressed by the reactance component of at least one of the transformer 12 or the reactor 45.

The measurement device 34 measures phase voltages Va(INV), Vb(INV), and Vc(INV) of the phases and line currents Ia(INV), Ib(INV), and Ic(INV) of the phases of the AC power output from the power conversion part 40, and inputs the measurement results to the controller 32.

The measurement device 36 measures phase voltages Va(PCS), Vb(PCS), and Vc(PCS) of the phases and line currents Ia(PCS), Ib(PCS), and Ic(PCS) of the phases of the AC power output from the major circuit part 30 (the filter circuit 42), measures active power P(PCS) at the output end of the major circuit part 30 and reactive power Q(PCS) at the output end of the major circuit part 30, and inputs the measurement results to the controller 32.

The controller 32 controls the conversion of the power by the major circuit part 30 by controlling the operation of the power conversion part 40. In other words, the controller 32 controls the switching of the multiple switching elements of the power conversion part 40.

The controller 32 receives the input of the measurement results of the measurement devices 34 and 36 and the input from the control device 10 of the active power command value and the reactive power command value of the AC power output from the major circuit part 30.

The controller 32 controls the operation of the power conversion part 40 based on the measurement results input from the measurement devices 34 and 36 and the active power command value and the reactive power command value input from the control device 10.

More specifically, based on the measurement results, the active power command value, and the reactive power command value that are input, the controller 32 calculates instantaneous value voltage output command values Va(ref), Vb(ref), and Vc(ref) of the phases of the AC power output from the power conversion part 40, and controls the operation of the power conversion part 40 so that voltages corresponding to the calculated instantaneous value voltage output command values Va(ref), Vb(ref), and Vc(ref) are output from the power conversion part 40.

Thus, the controller 32 controls the output voltage of the major circuit part 30. The controller 32 performs a voltage-controlled operation of the major circuit part 30. The measurement results are not limited to being directly input from the measurement devices 34 and 36 to the controller 32 and may be input to the controller 32 via, for example, a higher-level controller, etc.

Also, the measured value of the active power P(PCS) at the output end of the major circuit part 30 and the measured value of the reactive power Q(PCS) at the output end of the major circuit part 30 are not limited to a configuration in which the measured values are input from the measurement device 36 to the controller 32 and may be determined by, for example, being calculated inside the controller 32 based on the measured values of the phase voltages Va(PCS), Vb(PCS), and Vc(PCS) of the phases and the line currents Ia(PCS), Ib(PCS), and Ic(PCS) of the phases. The measurement device 36 may not always measure the active power P(PCS) and the reactive power Q(PCS).

The controller 32 includes a command value calculation part 50 and a control signal generator 52. The command value calculation part 50 receives the input of the active power command value and the reactive power command value input from the control device 10 and the measured values of the active power P(PCS) and the reactive power Q(PCS) measured by the measurement device 36. In other words, the measured value of the active power P(PCS) is the current active power output value Poutput of the major circuit part 30. In other words, the measured value of the reactive power Q(PCS) is the current reactive power output value Qoutput of the major circuit part 30.

Based on the active power command value Pref, a reactive power command value Qref, the active power output value Poutput, and the reactive power output value Qoutput that are input, the command value calculation part 50 calculates an output voltage phase δref, an output voltage frequency fref, and an output voltage amplitude Vref of the AC power output from the major circuit part 30 so that the active power corresponding to the active power command value Pref and the reactive power corresponding to the reactive power command value Qref are output from the major circuit part 30. For example, the command value calculation part 50 performs the calculations described above by voltage source voltage-controlled control logic such as a generator swing equation, droop control, etc.

As illustrated in FIG. 3, for example, the command value calculation part 50 calculates the output voltage phase δref and the output voltage frequency fref based on the active power command value Pref and the active power output value Poutput. Also, for example, the command value calculation part 50 calculates the output voltage amplitude Vref based on the reactive power command value Qref and the reactive power output value Qoutput.

The command value calculation part 50 inputs the output voltage phase δref, the output voltage frequency fref, and the output voltage amplitude Vref that are calculated to the control signal generator 52. It is sufficient to use a well-known calculation method to calculate the output voltage phase δref, the output voltage frequency fref, and the output voltage amplitude Vref.

The information that is used to calculate the command value calculation part 50 is not limited to only the active power command value Pref, the reactive power command value Qref, the active power output value Poutput, and the reactive power output value Qoutput and may include other information. The configuration of the command value calculation part 50 may be any configuration that can calculate the output voltage phase δref, the output voltage frequency fref, and the output voltage amplitude Vref based on at least the active power command value Pref, the reactive power command value Qref, the active power output value Poutput, and the reactive power output value Qoutput.

The control signal generator 52 calculates the instantaneous value voltage output command values Va(ref), Vb(ref), and Vc(ref) of the phases of the AC power of the power conversion part 40 based on the output voltage phase δref, the output voltage frequency fref, and the output voltage amplitude Vref that are input.

Also, for example, the control signal generator 52 generates control signals for outputting voltages corresponding to the instantaneous value voltage output command values Va(ref), Vb(ref), and Vc(ref) of the phases from the power conversion part 40, and inputs the generated control signals to the power conversion part 40. Accordingly, the control signal generator 52 outputs the voltages corresponding to the instantaneous value voltage output command values Va(ref), Vb(ref), and Vc(ref) of the phases to the power conversion part 40. In other words, the control signal generator 52 controls the operation of the power conversion part 40 to output the voltages corresponding to the instantaneous value voltage output command values Va(ref), Vb(ref), and Vc(ref) to the power conversion part 40. The control signal generator 52 causes the active power corresponding to the active power command value Pref and the reactive power corresponding to the reactive power command value Qref to be output from the major circuit part 30 by causing the voltages corresponding to the instantaneous value voltage output command values Va(ref), Vb(ref), and Vc(ref) to be output to the power conversion part 40.

For example, the control signal generator 52 generates the control signals for controlling the switching of the switching elements of the power conversion part 40 by performing sine wave pulse width modulation control based on the instantaneous value voltage output command values Va(ref), Vb(ref), and Vc(ref) of the phases. However, the configuration of the control signal generator 52 is not limited thereto and may be any configuration that can generate control signals for outputting the voltages corresponding to the instantaneous value voltage output command values Va(ref), Vb(ref), and Vc(ref) of the phases from the power conversion part 40.

For example, the function of performing the sine wave pulse width modulation control may be located at the power conversion part 40 side. For example, the control signal generator 52 may input the instantaneous value voltage output command values Va(ref), Vb(ref), and Vc(ref) of the phases themselves to the power conversion part 40 as the control signals.

Also, for example, the control signal generator 52 receives the input of the output voltage phase δref, the output voltage frequency fref, and the output voltage amplitude Vref, the measured values of the phase voltages Va(INV), Vb(INV), and Vc(INV) and the line currents Ia(INV), Ib(INV), and Ic(INV) measured by the measurement device 34, and the measured values of the phase voltages Va(PCS), Vb(PCS), and Vc(PCS) and the line currents Ia(PCS), Ib(PCS), and Ic(PCS) measured by the measurement device 36.

The control signal generator 52 calculates the instantaneous value voltage output command values Va(ref), Vb(ref), and Vc(ref) to suppress the overcurrent at the output end of the major circuit part 30 by using the output voltage phase δref, the output voltage frequency fref, and the output voltage amplitude Vref and at least one of the input information of the phase voltages Va(INV), Vb(INV), and Vc(INV), the line currents Ia(INV), Ib(INV), and Ic(INV), the phase voltages Va(PCS), Vb(PCS), and Vc(PCS), or the line currents Ia(PCS), Ib(PCS), and Ic(PCS).

Thus, even when voltage-controlled operation is performed, the occurrence of overcurrent can be suppressed by calculating the instantaneous value voltage output command values Va(ref), Vb(ref), and Vc(ref) to suppress the overcurrent at the output end of the major circuit part 30. For example, even when an instantaneous potential difference occurs due to an abrupt change of the system voltage, etc., the occurrence of an overcurrent in the major circuit part 30 and the undesirable malfunction of a component inside the major circuit part 30 such as a switching element of the power conversion part 40, etc., can be suppressed.

When the magnitude of the active power of the AC power output from the major circuit part 30 undesirably changes from the active power command value due to the suppression of the overcurrent, or when the magnitude of the reactive power of the AC power output from the major circuit part 30 undesirably changes from the reactive power command value due to the suppression of the overcurrent, the controller 32 notifies the control device 10 of the change of the active power or the change of the reactive power. When receiving the notification of the change of the active power or the change of the reactive power from the control device 10 of a specific power conversion device 6, the control device 10 controls the operation of another power conversion device 6 to adjust the change amount. The overcurrent of the specific power conversion device 6 is suppressed thereby, and even when the magnitude of the active power or the reactive power output from the specific power conversion device 6 has changed, the change of the magnitude of the active power and the reactive power output from the entirety of the multiple power conversion devices 6 can be suppressed.

For example, methods for calculating the instantaneous value voltage output command values Va(ref), Vb(ref), and Vc(ref) to suppress the overcurrent by using at least one of the input information described above are described in detail in reference documents such as PCT/JP2021/012721, PCT/JP2021/012723, etc.

However, the control signal generator 52 may not always have a configuration that calculates the instantaneous value voltage output command value to suppress the overcurrent. It is sufficient for the control signal generator 52 to have a configuration that can calculate the instantaneous value voltage output command value based on at least the output voltage phase, the output voltage frequency, and the output voltage amplitude.

The configuration of the controller 32 may be any configuration that can calculate the output voltage phase, the output voltage frequency, and the output voltage amplitude based on the active power command value, the reactive power command value, the active power output value, and the reactive power output value, calculate the instantaneous value voltage output command value based on the output voltage phase, the output voltage frequency, and the output voltage amplitude, and control the operation of the power conversion part 40 so that a voltage corresponding to the instantaneous value voltage output command value is output from the power conversion part 40.

When voltage source voltage-controlled power conversion devices are used as the multiple power conversion devices in a power supply system performing parallel operation in which the multiple power conversion devices are connected in parallel to an independent system, the operations of the power conversion devices may destabilize, and stable power supply to the independent system may not be possible.

As a result of diligent investigations, the inventor of the application monitored the frequency and voltage of the independent system, and by ascertaining the necessary amounts of the active power and the reactive power at which the frequency and the voltage can be maintained at constants, found that stable power can be supplied to the independent system even when the multiple voltage source voltage-controlled power conversion devices are operated in parallel.

In the power supply system 2 according to the embodiment, the control device 10 calculates the active power command values of the power conversion devices 6 corresponding to the active power required by the independent system IS; and the power conversion devices 6 perform voltage-controlled operations to output the active power corresponding to the active power command values. Accordingly, the fluctuation of the frequency of the independent system IS can be suppressed even when the multiple voltage source voltage-controlled power conversion devices 6 are operated in parallel. Also, in the power supply system 2 according to the embodiment, the control device 10 calculates the reactive power command values of the power conversion devices 6 corresponding to the reactive power required by the independent system IS; and the power conversion devices 6 perform voltage-controlled operations to output the reactive power corresponding to the reactive power command values. Accordingly, the fluctuation of the voltage of the independent system IS can be suppressed even when the multiple voltage source voltage-controlled power conversion devices 6 are operated in parallel. Accordingly, according to the power supply system 2 according to the embodiment, stable power can be supplied to the independent system IS even when the multiple voltage source voltage-controlled power conversion devices 6 are operated in parallel.

Also, as a result of diligent investigations, the inventor of the application found that more stable power can be supplied to the independent system even when the multiple voltage source voltage-controlled power conversion devices are operated in parallel by transmitting appropriate active power command values and reactive power command values to the multiple power conversion devices 6 by considering the active power and the reactive power that can be output by the multiple power conversion devices 6.

In the power supply system 2 according to the embodiment, the control device 10 proportionally processes the multiple active power command values so that the magnitudes of the active power are appropriate magnitudes of the active power corresponding to the states of the multiple power conversion devices 6, and proportionally process the multiple reactive power command values so that the magnitudes of the reactive power are appropriate magnitudes of the reactive power considering the reactive power output upper limits of the multiple power conversion devices 6. Accordingly, the fluctuation of the frequency and the fluctuation of the voltage of the independent system IS can be further suppressed even when the multiple voltage source voltage-controlled power conversion devices 6 are operated in parallel. Accordingly, according to the power supply system 2 according to the embodiment, more stable power can be supplied to the independent system IS even when the multiple voltage source voltage-controlled power conversion devices 6 are operated in parallel.

Furthermore, as a result of diligent investigations, the inventor of the application found that more stable power can be supplied to the independent system even when the multiple voltage source voltage-controlled power conversion devices are operated in parallel by suppressing the occurrence of cross current between the multiple power conversion devices 6.

In the power supply system 2 according to the embodiment, the multiple power conversion devices 6 are connected in parallel to the independent system IS via at least one of the transformer 12 or the reactor 45. Accordingly, according to the power supply system 2 according to the embodiment, more stable power can be supplied to the independent system IS even when the multiple voltage source voltage-controlled power conversion devices 6 are operated in parallel.

In the power supply system 2 according to the embodiment as described above, stable power can be supplied to the independent system IS even when the multiple voltage source voltage-controlled power conversion devices 6 are operated in parallel.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

The invention claimed is:

1. A power supply system for an independent system, comprising:

a plurality of power supply devices;

a plurality of power conversion devices connected in parallel to the independent system, the plurality of power conversion devices being voltage source voltage-controlled, the plurality of power conversion devices converting power supplied from the plurality of power supply devices into alternating current power corresponding to the independent system, the plurality of power conversion devices supplying the alternating current power after the conversion to the independent system; and a control device controlling conversion operations of the power of the plurality of power conversion devices, wherein the control device calculating a plurality of active power command values of the plurality of power conversion devices according to active power required by the independent system, and calculating a plurality of reactive power command values of the plurality of power conversion devices according to reactive power required by the independent system, wherein the plurality of power conversion devices performing voltage-controlled operations to output active power corresponding to the active power command values and to output reactive power corresponding to the reactive power command values, and wherein the control device proportionally processes the plurality of active power command values so that magnitudes of the active power correspond respectively to states of the plurality of power conversion devices, and proportionally processes the plurality of reactive power command values so that magnitudes of the reactive power respectively consider reactive power output upper limits of the plurality of power conversion devices.

2. The power supply system for the independent system according to claim 1, wherein the plurality of power supply devices is power storage devices supplying direct current power to the plurality of power conversion devices, the plurality of power conversion devices converts the direct current power supplied from the plurality of power supply devices into alternating current power corresponding to the independent system and supplies the alternating current power after the conversion to the independent system, the plurality of power conversion devices charges the plurality of power supply devices by converting the alternating current power of the independent system into direct current power, and the control device proportionally processes the plurality of active power command values so that:

the magnitudes of the active power when discharging are greater for the power conversion devices corresponding to the power supply devices having high remaining amounts of electrical storage capacities than for the power conversion devices corresponding to the power supply devices having low remaining amounts of electrical storage capacities; and the magnitudes of the active powers when charging are less for the power conversion devices corresponding to the power supply devices having high remaining amounts of electrical storage capacities than for the power conversion devices corresponding to the power supply devices having low remaining amounts of electrical storage capacities.

3. The power supply system for the independent system according to claim 1, wherein the plurality of power conversion devices is connected in parallel to the independent system via at least one of a transformer or a reactor.

4. A power supply system for an independent system, comprising:

a plurality of power supply devices;

a plurality of power conversion devices connected in parallel to the independent system, the plurality of power conversion devices being voltage source voltage-controlled, the plurality of power conversion devices converting power supplied from the plurality of power supply devices into alternating current power corresponding to the independent system, the plurality of power conversion devices supplying the alternating current power after the conversion to the independent system; and a control device controlling conversion operations of the power of the plurality of power conversion devices, wherein the control device calculating a plurality of active power command values of the plurality of power conversion devices according to active power required by the independent system, and calculating a plurality of reactive power command values of the plurality of power conversion devices according to reactive power required by the independent system, wherein the plurality of power conversion devices performing voltage-controlled operations to output active power corresponding to the active power command values and to output reactive power corresponding to the reactive power command values, wherein the plurality of power conversion devices includes:

a major circuit part performing a conversion of power; and a controller controlling the conversion of the power by the major circuit part, wherein the major circuit part includes:

a power conversion part performing the conversion of the power; and a filter circuit located between the power conversion part and the independent system, wherein, based on the active power command value, the reactive power command value, a current active power output value of the major circuit part, and a current reactive power output value of the major circuit part, the controller calculates an output voltage phase, an output voltage frequency, and an output voltage amplitude of alternating current power output from the major circuit part, wherein the controller calculates an instantaneous value voltage output command value of alternating current power of the power conversion part based on the output voltage phase, the output voltage frequency, and the output voltage amplitude, and wherein the controller controls an operation of the power conversion part so that a voltage corresponding to the instantaneous value voltage output command value is output from the power conversion part.

5. The power supply system for the independent system according to claim 4, wherein the controller calculates the instantaneous value voltage output command value to suppress overcurrent at an output end of the major circuit part by using:

the output voltage phase, the output voltage frequency, and the output voltage amplitude; and at least one of a phase voltage of alternating current power output from the power conversion part, a line current of the alternating current power output from the power conversion part, a phase voltage of alternating current power output from the major circuit part, or a line current of the alternating current power output from the major circuit part.

* * * * *